(12) United States Patent
Song et al.

(10) Patent No.: US 11,112,589 B2
(45) Date of Patent: Sep. 7, 2021

(54) OPTICAL IMAGING LENS ASSEMBLY

(71) Applicant: Zhejiang Sunny Optical Co., Ltd, Ningbo (CN)

(72) Inventors: Litong Song, Ningbo (CN); Lin Huang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 296 days.

(21) Appl. No.: 16/273,841

(22) Filed: Feb. 12, 2019

(65) Prior Publication Data
US 2019/0204570 A1 Jul. 4, 2019

Related U.S. Application Data

(63) Continuation of application No. PCT/CN2018/092209, filed on Jun. 21, 2018.

(30) Foreign Application Priority Data

Jan. 2, 2018 (CN) .......................... 201810001739.2
Jan. 2, 2018 (CN) .......................... 201820002645.2

(51) Int. Cl.
*G02B 13/00* (2006.01)
*G02B 13/18* (2006.01)
(Continued)

(52) U.S. Cl.
CPC ............. *G02B 13/18* (2013.01); *G02B 5/208* (2013.01); *G02B 9/34* (2013.01)

(58) Field of Classification Search
CPC .......... G02B 13/18; G02B 9/34; G02B 5/208; G02B 13/008; G02B 13/004; G02B 5/28;
(Continued)

(56) References Cited

U.S. PATENT DOCUMENTS 8,730,590 B1 * 5/2014 Tsai ..................... G02B 13/004
359/715
2005/0046970 A1 3/2005 Amanai
(Continued)

FOREIGN PATENT DOCUMENTS

CN 102436573 5/2012
CN 103217784 7/2013
(Continued)

*Primary Examiner* — Marin Pichler
*Assistant Examiner* — Henry A Duong
(74) *Attorney, Agent, or Firm* — Hauptman Ham, LLP

(57) ABSTRACT

The present disclosure discloses an optical imaging lens assembly. The lens assembly sequentially includes, from an object side to an image side along an optical axis: a first lens, a second lens, a third lens, and a fourth lens. The first lens has a positive refractive power, and a convex object-side surface; the second lens has a positive refractive power or a negative refractive power, and a concave object-side surface and a convex image-side surface; the third lens has a positive refractive power, a concave object-side surface, and a convex image-side surface; and the fourth lens has a positive refractive power or a negative refractive power. An effective focal length f1 of the first lens and a total effective focal length f of the optical imaging lens assembly satisfy: $1.2 < f1/f < 1.8$.

19 Claims, 6 Drawing Sheets

(51) Int. Cl.
*G02B 9/34* (2006.01)
*G02B 5/20* (2006.01)

(58) Field of Classification Search
CPC .... G02B 5/3075; G02B 5/3091; G02B 13/14; G02B 17/0892; G02B 19/0042; G02B 19/009; G02B 19/0095; G02B 21/0016; G02B 21/16; G02B 27/4294; C03C 4/082; C03C 4/10; G03F 7/70
USPC .......................................................... 359/350
See application file for complete search history.

(56) References Cited

U.S. PATENT DOCUMENTS

| | | | |
|---|---|---|---|
| 2014/0036133 A1* | 2/2014 | Sekine | G02B 15/14 348/340 |
| 2014/0133015 A1* | 5/2014 | Hsueh | G02B 13/004 359/357 |
| 2014/0146401 A1 | 5/2014 | Tsai et al. | |
| 2015/0286032 A1 | 10/2015 | Hsueh et al. | |
| 2017/0276904 A1 | 9/2017 | Lai et al. | |
| 2018/0132706 A1* | 5/2018 | Nagae | A61B 1/043 |

FOREIGN PATENT DOCUMENTS

| | | |
|---|---|---|
| CN | 106054358 | 10/2016 |
| CN | 106680976 | 5/2017 |
| CN | 107219610 | 9/2017 |
| CN | 107238911 | 10/2017 |
| CN | 107315236 | 11/2017 |
| JP | 2005-62559 | 3/2005 |

\* cited by examiner

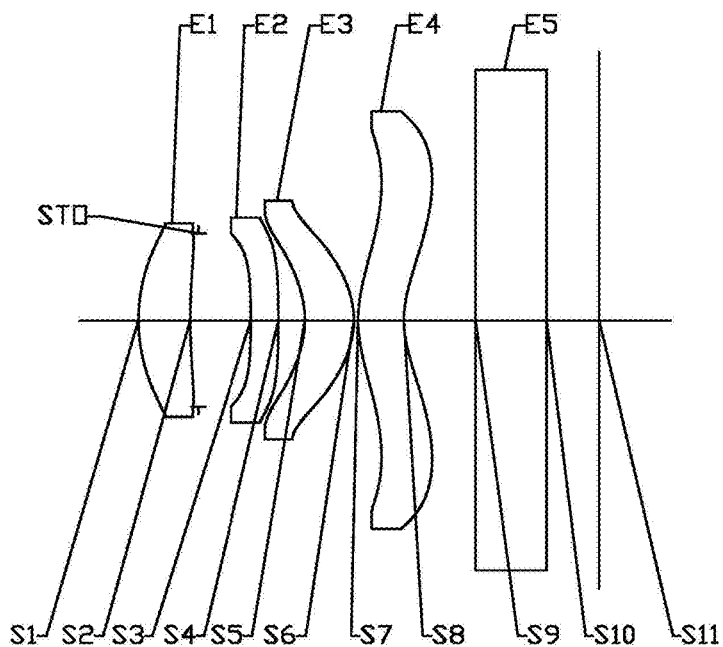
Fig. 1
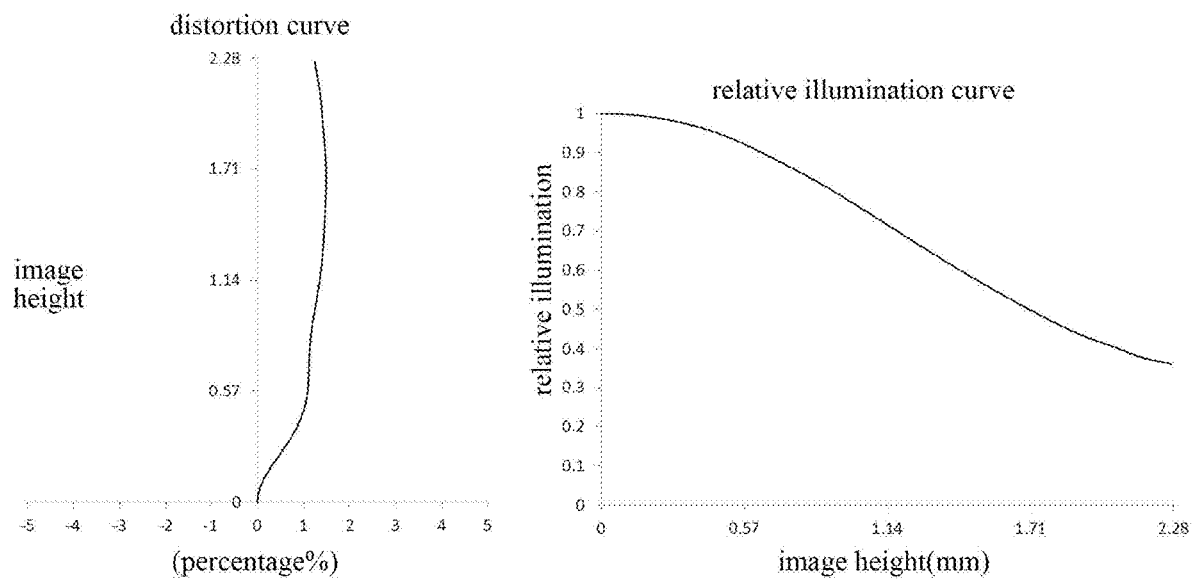
Fig. 2A
Fig. 2B

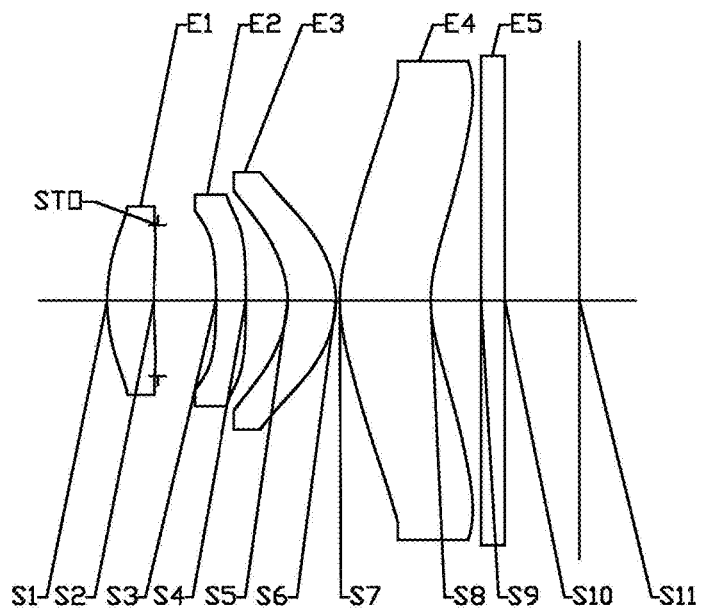
Fig. 5
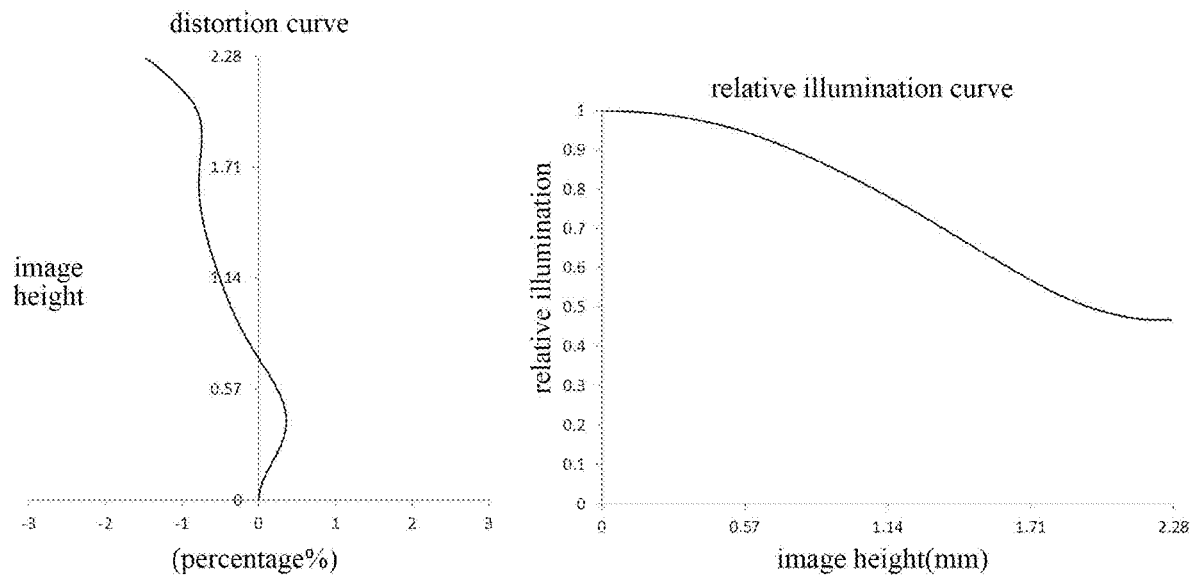
Fig. 6A
Fig. 6B

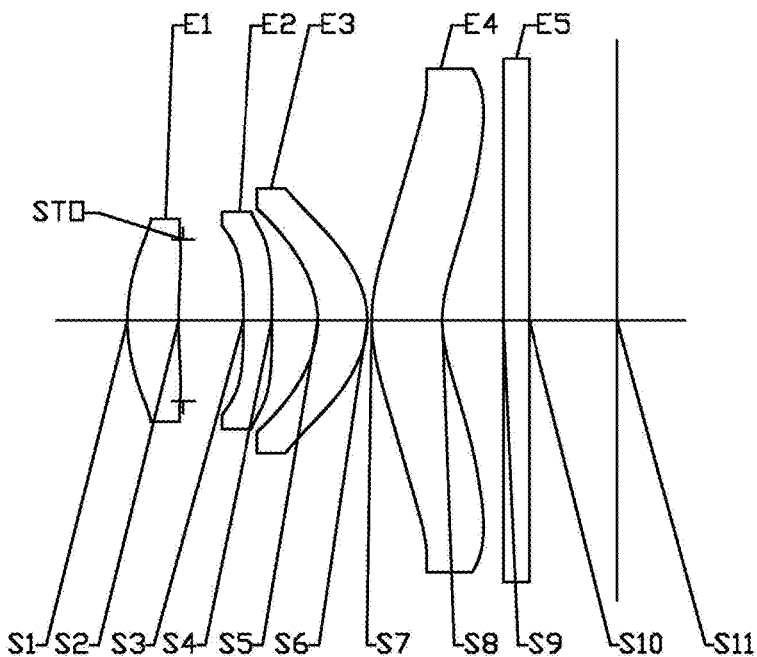
Fig. 7
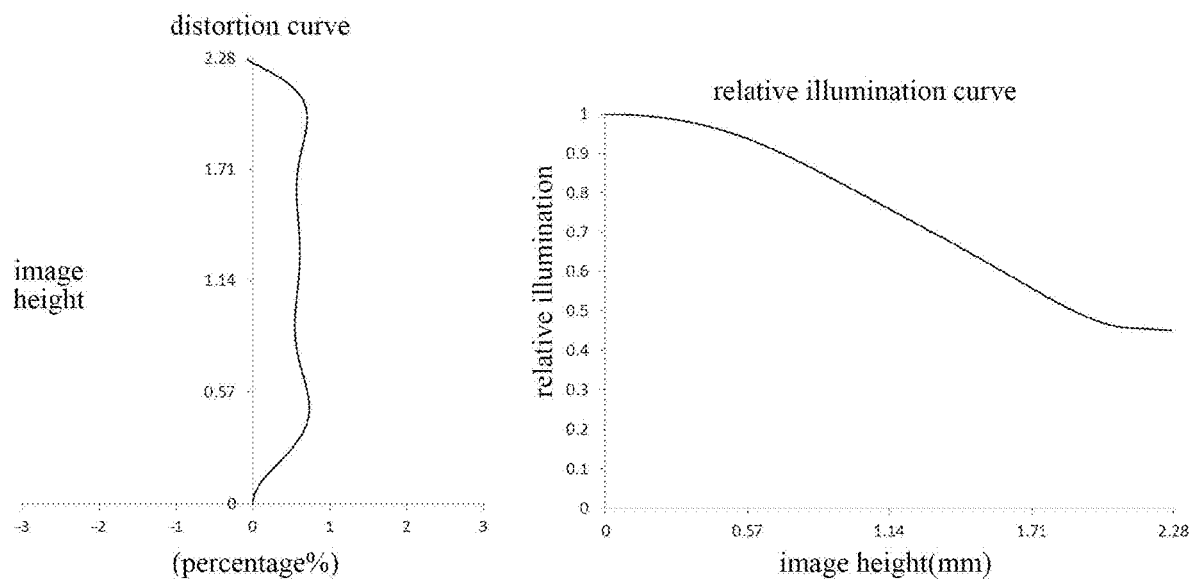
Fig. 8A
Fig. 8B

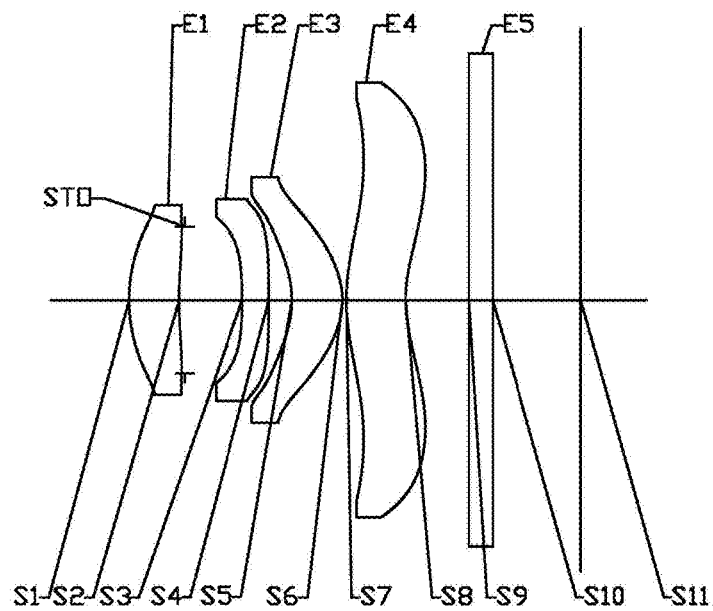
Fig. 9
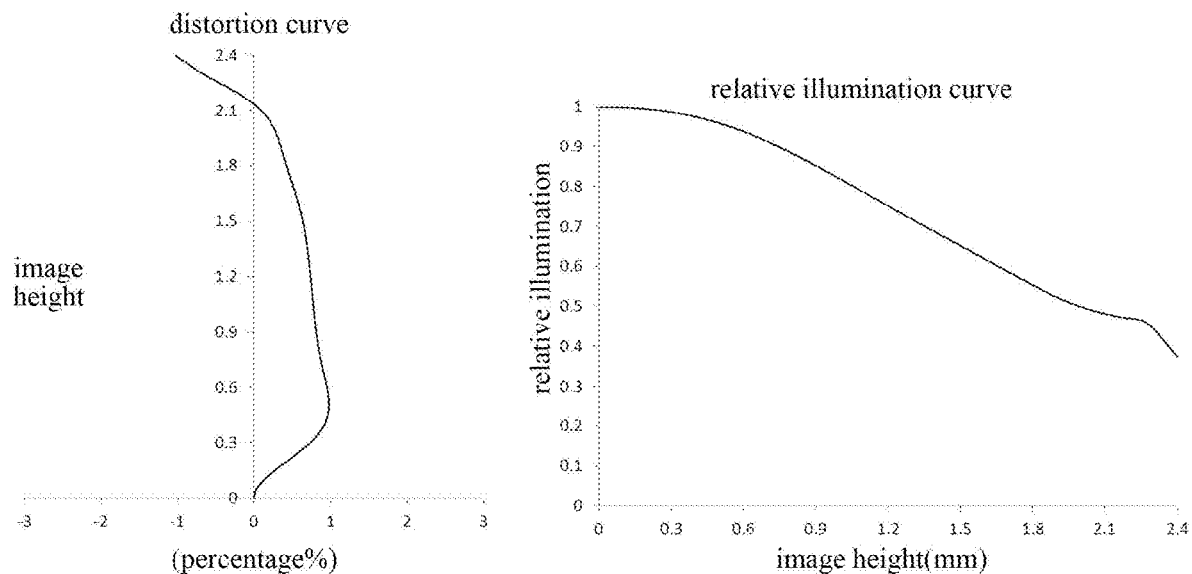
Fig. 10A
Fig. 10B

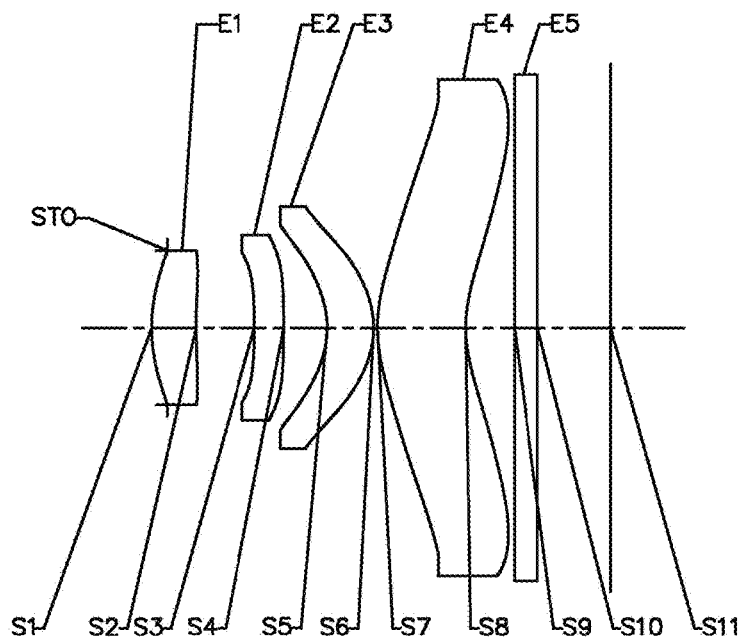
Fig. 11
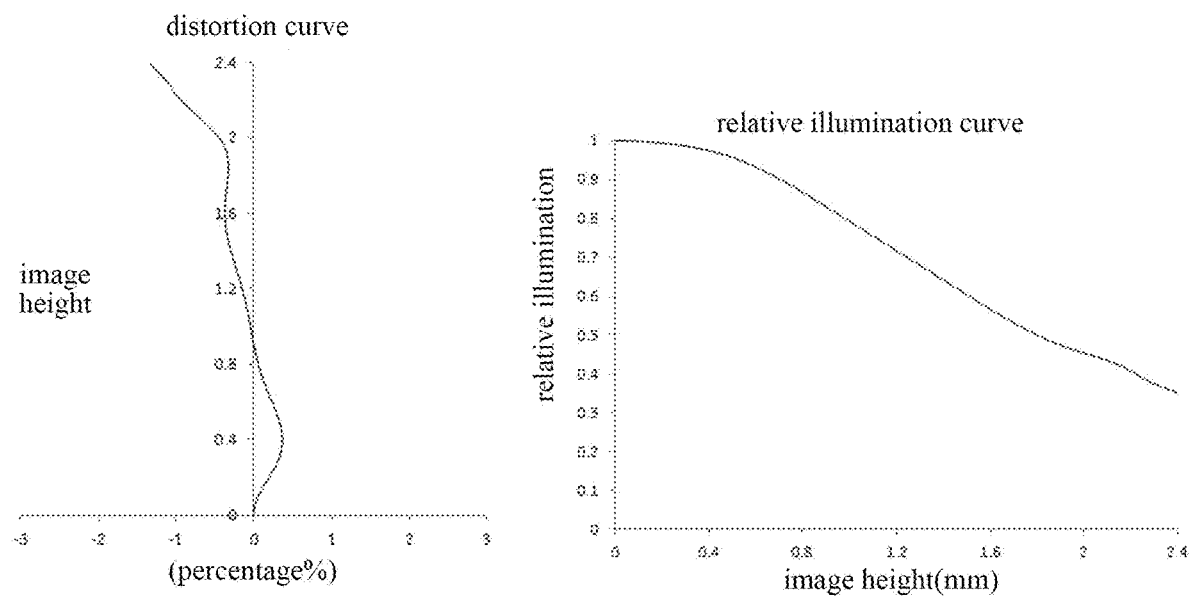
Fig. 12A
Fig. 12B

OPTICAL IMAGING LENS ASSEMBLY

CROSS-REFERENCE TO RELATED APPLICATIONS

This is a continuation of International Application PCT/CN2018/092209, with an international filing date of Jun. 21, 2018, which claims priorities and rights to Chinese Patent Application No. 201810001739.2 filed with the China National Intellectual Property Administration (CNIPA) on Jan. 2, 2018 and Chinese Patent Application No. 201820002645.2 filed with the CNIPA on Jan. 2, 2018, the disclosures of which are hereby incorporated by reference in their entireties.

TECHNICAL FIELD

The present disclosure relates to an optical imaging lens assembly, and more specifically to an optical imaging lens assembly including four lenses.

BACKGROUND

In recent years, with the rapid development of depth perception technology, 3D depth cameras have become more widely used in AR technology. The structured light scheme is one of the mainstream directions of the depth perception technology, and the principle of the depth perception of the structured light scheme is: projecting a special image (encoded pattern or dot matrix image) onto a target object by a projection lens assembly module; receiving image information reflected from the target object by using an imaging receiving module; and obtaining depth information of the target object by processing the received image information using a backend algorithm. The imaging receiving lens assembly is one of the core elements of the structured light depth perception technology, and its optical performance greatly affects the accuracy of the depth perception.

Therefore, there is a need for an optical imaging lens assembly having characteristics of small aberrations and high resolution, which may be used as the imaging receiving lens assembly in depth perception applications.

SUMMARY

The present disclosure provides an optical imaging lens assembly that may be used as an imaging receiving lens assembly in a depth perception application and may at least solve or partially solve at least one of the above disadvantages in the existing technology.

According to an aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. An effective focal length $f1$ of the first lens and a total effective focal length $f$ of the optical imaging lens assembly may satisfy: $1.2<f1/f<1.8$.

In an implementation, the optical imaging lens assembly may further include an infrared bandpass optical filter disposed between the fourth lens and an image plane of the optical imaging lens assembly, a bandpass wavelength $\lambda$ of the infrared bandpass optical filter may fluctuate based on a wavelength of a used light source, and when a transmittance of the bandpass wavelength $\lambda$ is greater than 50%, a long-wave cutoff wavelength of the bandpass wavelength $\lambda$ may be longer than the longest wavelength of the used light source by 0 nm to 30 nm, and a short-wave cutoff wavelength of the bandpass wavelength $\lambda$ may be shorter than the shortest wavelength of the used light source by 0 nm to 30 nm.

In an implementation, a radius of curvature $R1$ of the object-side surface of the first lens and the total effective focal length $f$ of the optical imaging lens assembly may satisfy: $0.3<R1/f<0.7$.

In an implementation, the radius of curvature $R1$ of the object-side surface of the first lens and the effective focal length $f1$ of the first lens may satisfy: $0.3<R1/f1<0.6$.

In an implementation, a maximum effective half aperture $DT11$ of the object-side surface of the first lens and a center thickness $CT1$ of the first lens on the optical axis may satisfy: $1.7<DT11/CT1<2.2$.

In an implementation, a sum of center thicknesses $\Sigma CT$ of the first lens, the second lens, the third lens, and the fourth lens on the optical axis and a spacing distance $TTL$ of the object-side surface of the first lens to the image plane of the optical imaging lens assembly on the optical axis may satisfy: $0.2<\Sigma CT/TTL<0.5$.

In an implementation, a spacing distance $T12$ of the first lens to the second lens on the optical axis and the spacing distance $TTL$ of the object-side surface of the first lens to the image plane of the optical imaging lens assembly on the optical axis may satisfy: $0.1<T12/TTL<0.2$.

In an implementation, a spacing distance $T34$ of the third lens to the fourth lens on the optical axis and a spacing distance $T23$ of the second lens to the third lens on the optical axis may satisfy: $T34/T23<0.2$.

In an implementation, a center thickness $CT2$ of the second lens on the optical axis and a center thickness $CT3$ of the third lens on the optical axis may satisfy: $0.4<CT2/CT3<0.7$.

In an implementation, a center thickness $CT4$ of the fourth lens on the optical axis and an edge thickness $ET4$ of the fourth lens may satisfy: $1.2<CT4/ET4<2.4$.

In an implementation, the maximum effective half aperture $DT11$ of the object-side surface of the first lens and a maximum effective half aperture $DT21$ of the object-side surface of the second lens may satisfy: $1.0 \leq DT11/DT2<1.3$.

In an implementation, the maximum effective half aperture $DT11$ of the object-side surface of the first lens and a maximum effective half aperture $DT22$ of the image-side surface of the second lens may satisfy: $0.8<DT11/DT22<1.1$.

In an implementation, a radius of curvature $R5$ of the object-side surface of the third lens and a radius of curvature $R6$ of the image-side surface of the third lens may satisfy: $0.9<R5/R6<1.3$.

In an implementation, a distance $SAG31$ from an intersection point of the object-side surface of the third lens and the optical axis to a vertex of a maximum effective half aperture of the object-side surface of the third lens on the optical axis and the center thickness CT3 of the third lens on the optical axis may satisfy: $-1.3<SAG31/CT3<-0.7$.

In an implementation, a maximum effective half aperture DT42 of an image-side surface of the fourth lens and half of a diagonal length ImgH of an effective pixel area of a photosensitive element on the image plane of the optical imaging lens assembly may satisfy: $0.7<DT42/ImgH<1$.

In an implementation, the total effective focal length f of the optical imaging lens assembly and an entrance pupil diameter EPD of the optical imaging lens assembly may satisfy: $f/EPD≤2.1$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A center thickness CT2 of the second lens on the optical axis and a center thickness CT3 of the third lens on the optical axis may satisfy: $0.4<CT2/CT3<0.7$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. The optical imaging lens assembly may further include an infrared bandpass optical filter disposed between the fourth lens and an image plane of the optical imaging lens assembly, a bandpass wavelength λ of the infrared bandpass optical filter may fluctuate based on a wavelength of a used light source, and when a transmittance of the bandpass wavelength λ is greater than 50%, a long-wave cutoff wavelength of the bandpass wavelength λ may be longer than the longest wavelength of the used light source by 0 nm to 30 nm, and a short-wave cutoff wavelength of the bandpass wavelength λ may be shorter than the shortest wavelength of the used light source by 0 nm to 30 nm.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-aide surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A total effective focal length f of the optical imaging lens assembly and an entrance pupil diameter EPD of the optical imaging lens assembly may satisfy: $f/EPD≤2.1$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A maximum effective half aperture DT42 of an image-side surface of the fourth lens and half of a diagonal length ImgH of an effective pixel area of a photosensitive element on an image plane of the optical imaging lens assembly may satisfy: $0.7<DT42/ImgH<1$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A distance SAG31 from an intersection point of the object-side surface of the third lens and the optical axis to a vertex of a maximum effective half aperture of the object-side surface of the third lens on the optical axis and a center thickness CT3 of the third lens on the optical axis may satisfy: $-1.3<SAG31/CT3<-0.7$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A center thickness CT4 of the fourth lens on the optical axis and an edge thickness ET4 of the fourth lens may satisfy: $1.2<CT4/ET4<2.4$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A maximum effective half aperture DT11 of the object-side surface of the first lens and a maximum effective half aperture DT21 of the object-side surface of the second lens may satisfy: $1.0 \leq DT11/DT21 < 1.3$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A maximum effective half aperture DT11 of the object-side surface of the first lens and a maximum effective half aperture DT22 of the image-side surface of the second lens may satisfy: $0.8 < DT11/DT22 < 1.1$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A maximum effective half aperture DT11 of the object-side surface of the first lens and a center thickness CT1 of the first lens on the optical axis may satisfy: $1.7 < DT11/CT1 < 2.2$.

According to another aspect, the present disclosure discloses an optical imaging lens assembly. The lens assembly sequentially may include, from an object side to an image side along an optical axis: a first lens, a second lens, a third lens, and a fourth lens. The first lens may have a positive refractive power, and an object-side surface of the first lens may be a convex surface; the second lens has a positive refractive power or a negative refractive power, an object-side surface of the second lens may be a concave surface, and an image-side surface of the second lens may be a convex surface; the third lens may have a positive refractive power, an object-side surface of the third lens may be a concave surface, and an image-side surface of the third lens may be a convex surface; and the fourth lens has a positive refractive power or a negative refractive power. A spacing distance T34 of the third lens to the fourth lens on the optical axis and a spacing distance T23 of the second lens to the third lens on the optical axis may satisfy: $T34/T23 < 0.2$.

In the present disclosure, a plurality of lenses (e.g., four lenses) are used. By reasonably distributing the refractive powers and the surface types of the lenses, the center thicknesses of the lenses and the on-axis spacing distances between the lenses, the optical imaging lens assembly has at least one advantageous effect such as miniaturization, small aberrations, and high resolution. In addition, the optical imaging lens assembly with the above configuration can better meet the requirements for the imaging receiving lens assembly in a depth perception application.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIG. 1 is a schematic structural diagram illustrating an optical imaging lens assembly according to Embodiment 1 of the present disclosure;

FIGS. 2A-2B respectively illustrate a distortion curve and a relative illumination curve of the optical imaging lens assembly according to Embodiment 1;

FIG. 5 is a schematic structural diagram illustrating an optical imaging lens assembly according to Embodiment 3 of the present disclosure;

FIGS. 6A-6B respectively illustrate a distortion curve and a relative illumination curve of the optical imaging lens assembly according to Embodiment 3;

FIG. 7 is a schematic structural diagram illustrating an optical imaging lens assembly according to Embodiment 4 of the present disclosure;

FIGS. 8A-8B respectively illustrate a distortion curve and a relative illumination curve of the optical imaging lens assembly according to Embodiment 4;

FIG. 9 is a schematic structural diagram illustrating an optical imaging lens assembly according to Embodiment 5 of the present disclosure;

FIGS. 10A-10B respectively illustrate a distortion curve and a relative illumination curve of the optical imaging lens assembly according to Embodiment 5;

FIG. 11 is a schematic structural diagram illustrating an optical imaging lens assembly according to Embodiment 6 of the present disclosure; and FIGS. 12A-12B respectively illustrate a distortion curve and a relative illumination curve of optical imaging lens assembly according to Embodiment 6.

DETAILED DESCRIPTION OF EMBODIMENTS

Figure 3:
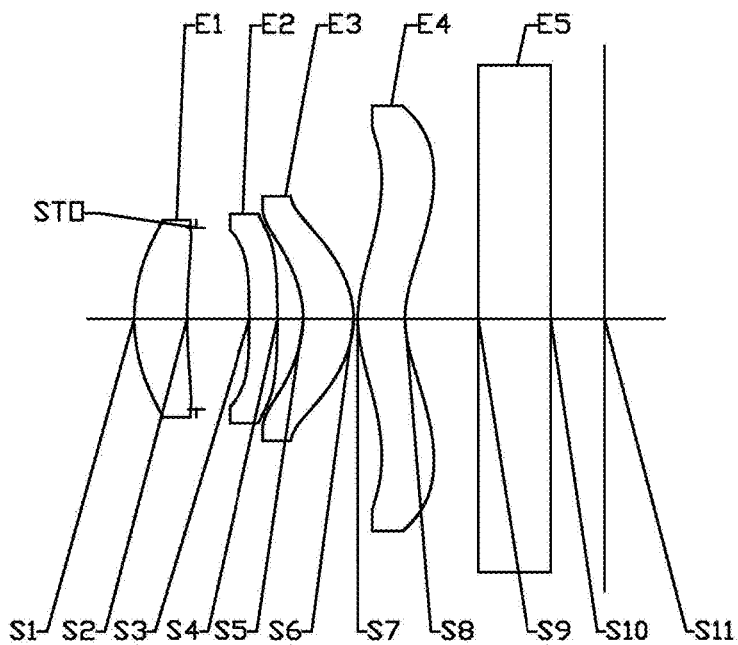
FIG. 3 is a schematic structural diagram illustrating an optical imaging lens assembly according to Embodiment 2 of the present disclosure.

For a better understanding of the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the identical reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area near the optical axis. If the surface of a lens is a convex surface and the position of the convex surface is not defined, it indicates that the surface of the lens is convex at least at the paraxial area; if the surface of a lens is a concave surface and the position of the concave surface is not defined, it indicates that the surface of the lens is concave at least at the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The optical imaging lens assembly according to exemplary implementations of the present disclosure includes, for example, four lenses having refractive powers, that is, a first lens, a second lens, a third lens, and a fourth lens. The four lenses are sequentially arranged from an object side to an image side along an optical axis. The optical imaging lens assembly may further include a photosensitive element disposed on an image plane.

In the exemplary implementations, the first lens may have a positive refractive power, and an object-side surface of the first lens may be a convex surface. The second lens has a positive refractive power or a negative refractive power, an object-side surface of the second lens may be a concave surface, and an image-side surface of the second lens may be a convex surface. The third lens may have a positive refractive power, an object-side surface of the third lens may be a concave surface, and an image-side surface of the third lens may be a convex surface. The fourth lens has a positive refractive power or a negative refractive power.

In the exemplary implementations, the optical imaging lens assembly of the present disclosure may further include an infrared bandpass optical filter disposed between the fourth lens and the image plane of the optical imaging lens assembly, the bandpass wavelength $\lambda$ of the infrared bandpass optical filter may fluctuate based on a wavelength of a used light source. When the transmittance of the bandpass wavelength $\lambda$ is greater than 50%, a long-wave cutoff wavelength of the bandpass wavelength $\lambda$ is longer than the longest wavelength of the used light source by 0 nm to 30 nm, and a short-wave cutoff wavelength of the bandpass wavelength $\lambda$ is shorter than the shortest wavelength of the used light source by 0 nm to 30 nm. Such setting is advantageous for achieving small aberrations, high resolution, or the like. Different from the waveband used by general lens assemblies, the waveband used by the imaging lens assembly according to the present disclosure may be a single wavelength of an infrared laser and has a narrow bandwidth.

When the refractive powers and the concave-convex surface arrangements of the lenses coincide with the combination of the above refractive powers and the concave-convex surface arrangements, each surface of each lens in the imaging lens assembly can evenly share the function of aberration correction, thereby effectively correcting aberrations such as the spherical aberration, coma, curvature of field, or astigmatism. In particular, such setting can provide a good correction effect for the edge light convergence (for example, providing a good correction effect for the edge light convergence in a large aperture narrowband optical system), enabling the lens assembly to meet the requirement of high resolution. At the same time, the imaging lens assembly according to the above setting may have a good imaging quality in a certain narrow-band low-pass infrared waveband.

In the exemplary implementations, an object-side surface of the fourth lens may be a convex surface, and an image-side surface of the fourth lens may be a concave surface.

In the exemplary implementations, the optical imaging lens assembly of the present disclosure may satisfy the conditional expression: $1.2<f1/f<1.8$, here, f1 is the effective focal length of the first lens and f is the total effective focal length of the optical imaging lens assembly. More specifically, f1 and f may further satisfy: $1.20<f1/f<1.50$, for example, $1.29 \leq f1/f \leq 1.42$. Properly configuring the effective focal length of the first lens may effectively correct the spherical aberration of the lens assembly and ensure high imaging quality.

In the exemplary implementations, the optical imaging lens assembly of the present disclosure may satisfy the conditional expression: f/EPD≤2.1, here, f is the total effective focal length of the optical imaging lens assembly, and EPD is the entrance pupil diameter of the optical imaging lens assembly. More specifically, f and EPD may further satisfy: 1.65≤f/EPD≤1.99. Satisfying the conditional expression of f/EPD≤2.1, the lens assembly may have a large amount of light entering per unit time to meet the high brightness requirement for receiving an image.

In the exemplary implementations, the optical imaging lens assembly of the present disclosure may satisfy the conditional expression: 0.7<DT42/ImgH<1, here, DT42 is the maximum effective half aperture of the image-side surface of the fourth lens and ImgH is the half of the diagonal length of the effective pixel area of the photosensitive element on the image plane of the optical imaging lens assembly. More specifically, DT42 and ImgH may further satisfy: 0.78≤DT42/ImgH≤0.94. Satisfying the conditional expression of 0.7<DT42/ImgH<1 is advantageous for meeting the miniaturization requirement while ensuring a high relative brightness.

In the exemplary implementations, the optical imaging lens assembly of the present disclosure may satisfy the conditional expression: 0.9<R5/R6<1.3, here, R5 is the radius of curvature of the object-side surface of the third lens and R6 is the radius of curvature of the image-side surface of the third lens. More specifically, R5 and R6 may further satisfy: 0.95≤R5/R6≤1.29. By properly controlling the bending direction and bending degree of the object-side surface and the image-side surface of the third lens, the curvature of field aberration of the imaging system may be effectively corrected, and the imaging quality balance between the central field-of-view area and the edge field-of-view area can be ensured.

In the exemplary implementations, the optical imaging lens assembly of the present disclosure may satisfy the conditional expression: −1.3<SAG31/CT3<−0.7, here, SAG31 is the distance from the intersection of the object-side surface of the third lens and the optical axis to the vertex of the maximum effective half aperture of the object-side surface of the third lens on the optical axis, and CT3 is the center thickness of the third lens on the optical axis. More specifically, SAG31 and CT3 may further satisfy: −1.23≤SAG31/CT3≤−0.80. By satisfying the conditional expression of −1.3<SAG31/CT3<−0.7, the spherical aberration of the imaging lens assembly may be corrected to obtain a high imaging quality; at the same time, the system sensitivity of the lens assembly may be effectively reduced, and the lens assembly is guaranteed to have good mass production.

In the exemplary implementations, the optical imaging lens assembly of the present disclosure may satisfy the conditional expression: 1.2<CT4/ET4<2.4, here, CT4 is the center thickness of the fourth lens on the optical axis and ET4 is the edge thickness of the fourth lens. More specifically, CT4 and ET4 may further satisfy: 1.29≤CT4/ET4≤2.36. Satisfying the conditional expression of 1.2<CT4/ET4<2.4 can ensure the center thickness and the edge thickness of the fourth lens to be in a reasonable ratio, it is very advantageous to obtain a large amount of light in the edge field-of-view, thereby making the lens assembly have a high relative brightness.

In the exemplary implementations, the optical imaging lens assembly of the present disclosure may satisfy the conditional expression: 1.0≤DT11/DT21<1.3, here, DT11 is the maximum effective half aperture of the object-side surface of the first lens and DT21 is the maximum effective half aperture of the object-side surface of the second lens. More specifically, DT11 and DT21 may further satisfy: 1.0≤DT11/DT21<1.2, for example, 1.04≤DT11/DT21≤1.14. Satisfying the conditional expression of 1.0≤DT11/DT21<1.3 is conducive to the assembling of the lens assembly and ensures the productivity of the lens assembly.

In the exemplary implementations, the optical imaging lens assembly of the present disclosure may satisfy the conditional expression: 0.8<DT11/DT22<1.1, here, DT11 is the maximum effective half aperture of the object-side surface of the first lens and DT22 is the maximum effective half aperture of the image-side surface of the second lens. More specifically, DT11 and DT22 may further satisfy: 0.8<DT11/DT22<1.0, for example, 0.8≤DT11/DT22≤0.94. Satisfying the conditional expression of 0.8<DT11/DT22<1.1 is beneficial to maintain a uniform incremental gradient of the outer diameter of each lens, thereby facilitating the assembling of the lens assembly and ensuring the processability of the lens assembly.

In the exemplary implementations, the optical imaging lens assembly of the present disclosure may satisfy the conditional expression: 0.4<CT2/CT3<0.7, here, CT2 is the center thickness of the second lens on the optical axis and CT3 is the center thickness of the third lens on the optical axis. More specifically, CT2 and CT3 may further satisfy: 0.5<CT2/CT3<0.7, for example, 0.53≤CT2/CT3≤0.64. Satisfying the conditional expression of 0.4<CT2/CT3<0.7 is beneficial to better correct the curvature of field aberration in the tangential direction; at the same time, the astigmatic aberration of the imaging system may be effectively controlled, thereby obtaining a high imaging quality.

In the exemplary implementations, the optical imaging lens assembly of the present disclosure may satisfy the conditional expression: 0.1<T12/TTL<0.2, here, T12 is the spacing distance of the first lens to the second lens on the optical axis and TTL is the spacing distance of the object-side surface of the first lens to the image plane of the optical imaging lens assembly on the optical axis. More specifically, T12 and TTL may further satisfy: 0.13≤T12/TTL≤0.14. Satisfying the conditional expression of 0.1<T12/TTL<0.2 may better eliminate the coma of the imaging system and obtain a high imaging quality.

In the exemplary implementations, the optical imaging lens assembly of the present disclosure may satisfy the conditional expression: 1.7<DT11/CT1<2.2, here, DT11 is the maximum effective half aperture of the object-side surface of the first lens and CT1 is the center thickness of the first lens on the optical axis. More specifically, DT11 and CT1 may further satisfy: 1.74≤DT11/CT1≤2.02. Satisfying the conditional expression of 1.7<DT11/CT1<2.2 may better eliminate the spherical aberration of the imaging system and obtain a high imaging quality.

In the exemplary implementations, the optical imaging lens assembly of the present disclosure may satisfy the conditional expression: T34/T23<0.2, here, T34 is the spacing distance of the third lens to the fourth lens on the optical axis and T23 is the spacing distance of the second lens to the third lens on the optical axis. More specifically, T34 and T23 may further satisfy: 0.09≤T34/T23≤0.17. The air spacing between the second lens, the third lens and the fourth lens is reasonably arranged, so that the second lens and the third lens may reasonably share the spherical aberration correction, thereby obtaining a high-quality imaging effect.

In the exemplary implementations, the optical imaging lens assembly of the present disclosure may satisfy the conditional expression: 0.2<ΣCT/TTL<0.5, here, ΣCT is the sum of the center thicknesses of the first lens, the second lens, the third lens, and the fourth lens on the optical axis and TTL is the spacing distance of the object-side surface of the first lens to the image plane of the optical imaging lens assembly on the optical axis. More specifically, ΣCT and TTL may further satisfy: 0.3<ΣCT/TTL<0.5, for example, 0.38≤ΣCT/TTL≤0.46. Satisfying the conditional expression of 0.2<ΣCT/TTL<0.5, the aberration of the off-axis field-of-view area of the imaging system may be better corrected, and at the same time, it is advantageous for the lenses to have better processability.

In the exemplary implementations, the optical imaging lens assembly of the present disclosure may satisfy the conditional expression: 0.3<R1/f<0.7, here, R1 is the radius of curvature of the object-side surface of the first lens and f is the total effective focal length of the optical imaging lens assembly. More specifically, R1 and f may further satisfy: 0.5<R1/f<0.6, for example, 0.52≤R1/f≤0.59. Satisfying the conditional expression of 0.3<R1/f<0.7, the aberration of the off-axis field-of-view area of the system may be better corrected, and the high resolution of the central field-of-view area may be ensured; at the same time, it is advantageous to obtain a large lens assembly aperture.

In the exemplary implementations, the optical imaging lens assembly of the present disclosure may satisfy the conditional expression: 0.3<R1/f1<0.6, here, R1 is the radius of curvature of the object-side surface of the first lens and f1 is the effective focal length of the first lens. More specifically, R1 and f1 may further satisfy: 0.3<R1/f1<0.5, for example, 0.39≤R1/f1≤0.42. When the conditional expression of 0.3<R1/f1<0.6 is satisfied, the spherical aberration of the imaging system may be better corrected, which is advantageous for obtaining a high-quality imaging effect.

In the exemplary implementations, the optical imaging lens assembly may also include at least one diaphragm STO for improving the imaging quality of the lens assembly. The diaphragm may be disposed at any position as needed, for example, the diaphragm may be disposed between the object side and the first lens, or the diaphragm may also be disposed between the first lens and the second lens.

Alternatively, the optical imaging lens assembly may further include a cover glass for protecting the photosensitive element on the image plane.

The optical imaging lens assembly according to the above implementations of the present disclosure may use a plurality of lenses, for example, four lenses as described above. By reasonably distributing the refractive power of each lens, the surface type of each lens, the center thickness of each lens, the spacing distances between the lenses on the axis, etc., the volume of the imaging lens assembly may be effectively reduced, the sensitivity of the imaging lens assembly may be reduced, and the processability of the imaging lens assembly may be improved, making the optical imaging lens assembly more conducive to production and processing and applicable to small electronic devices. In addition, the optical imaging lens assembly with the above configurations further has beneficial effects such as small aberrations and high resolution, and can well meet the requirements for the imaging receiving lens assembly in the depth perception application.

In the implementations of the present disclosure, at least one of the surfaces of the each lens is an aspheric surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, having advantages of improving the distortion aberration and improving the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having four lenses is described as an example in the implementations, the optical imaging lens assembly is not limited to include four lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2B. FIG. 1 is a schematic structural diagram illustrating the optical imaging lens assembly according to Embodiment 1 of the present disclosure.

As shown in FIG. 1, the optical imaging lens assembly according to the exemplary implementations of the present disclosure may sequentially include: a first lens E1, a diaphragm STO, a second lens E2, a third lens E3, a fourth lens E4, an optical filter E5 and an image plane S11 from the object side to the image side along the optical axis. The optical imaging lens assembly may further include a photosensitive element disposed on the image plane S11.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface.

The optical filter E5 may be an infrared bandpass optical filter having an object-side surface S9 and an image-side surface S10. The bandpass wavelength λ of the optical filter E5 may fluctuate based on the wavelength of the used light source, and when the transmittance of the bandpass wavelength λ is greater than 50%, the long-wave cutoff wavelength of the bandpass wavelength λ is longer than the longest wavelength of the used light source by 0 nm to 30 nm, and the short-wave cutoff wavelength of the bandpass wavelength λ is shorter than the shortest wavelength of the used light source by 0 nm to 30 nm.

Light from an object passes through the surfaces S1 to S10 sequentially and is finally imaged on the image plane S11.

Table 1 shows the surface type, the radius of curvature, the thickness, the material and the conic coefficient of each lens of the optical imaging lens assembly in Embodiment 1. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | 500.0000 | | | |
| S1 | aspheric | 1.4684 | 0.4413 | 1.53 | 55.8 | −0.3375 |
| S2 | aspheric | 5.2459 | 0.0706 | | | 40.2114 |
| STO | spherical | infinite | 0.4499 | | | |
| S3 | aspheric | −7.9090 | 0.2350 | 1.53 | 55.8 | 90.7449 |
| S4 | aspheric | −8.0000 | 0.2257 | | | −66.3022 |
| S5 | aspheric | −0.8016 | 0.4164 | 1.62 | 23.5 | −0.8436 |
| S6 | aspheric | −0.7398 | 0.0350 | | | −2.7512 |
| S7 | aspheric | 1.1271 | 0.3895 | 1.62 | 23.5 | −1.3795 |
| S8 | aspheric | 0.8630 | 0.6101 | | | −6.0289 |
| S9 | spherical | infinite | 0.6100 | 1.52 | 64.2 | |
| S10 | spherical | infinite | 0.4476 | | | |
| S11 | spherical | infinite | | | | |

As can be obtained from Table 1, the object-side surface and the image-side surface of any one of the first lens E1 to the fourth lens E4 are aspheric surfaces. In the present embodiment, the surface type x of each aspheric lens may be defined by, but not limited to, the following aspheric formula:

$$x = \frac{ch^2}{1 + \sqrt{1 - (k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below gives the high-order coefficients $A_4, A_6, A_8, A_{10}, A_{12}, A_{14}$ and $A_{16}$ applicable to the aspheric surfaces S1-S8 in Embodiment 1.

The optical imaging lens assembly in Embodiment 1 satisfies at least one of the following conditions.

f1/f=1.38, here, f1 is the effective focal length of the first lens E1, and f is the total effective focal length of the optical imaging lens assembly.

f/EPD=1.70, here, f is the total effective focal length of the optical imaging lens assembly, and EPD is the entrance pupil diameter of the optical imaging lens assembly.

DT42/ImgH=0.78, here, DT42 is the maximum effective half aperture of the image-side surface S8 of the fourth lens E4, and ImgH is the half of the diagonal length of the effective pixel area of the photosensitive element on the image plane S11.

R5/R6=1.08, here, R5 is the radius of curvature of the object-side surface S5 of the third lens E3, and R6 is the radius of curvature of the image-side surface S6 of the third lens E3.

SAG31/CT3=−0.82, here, SAG31 is the distance from the intersection of the object-side surface S5 of the third lens E3 and the optical axis to the vertex of the maximum effective half aperture of the object-side surface S5 of the third lens E3 on the optical axis, and CT3 is the center thickness of the third lens E3 on the optical axis.

TABLE 2

| surface number | A4 | A6 | A8 | A10 | A12 | A14 | A16 |
|---|---|---|---|---|---|---|---|
| S1 | 5.4245E−03 | −1.0041E−01 | 1.2427E+00 | −5.8561E+00 | 1.2857E+01 | −1.3611E+01 | 5.3755E+00 |
| S2 | −6.2944E−02 | 2.0953E−02 | −1.6610E+00 | 9.0631E+00 | −2.5445E+01 | 3.4154E+01 | −1.8264E+01 |
| S3 | −1.5221E−01 | −7.4008E−01 | 1.6603E+00 | −5.4391E+00 | 1.4329E+01 | −2.6241E+01 | 2.0370E+01 |
| S4 | −3.0623E−02 | −2.1759E−01 | −2.0148E+00 | 8.9557E+00 | −1.7477E+01 | 1.6545E+01 | −5.9010E+00 |
| S5 | 7.2130E−01 | −2.0229E+00 | 3.3343E+00 | −3.9645E+00 | 5.6109E+00 | −5.1050E+00 | 1.7554E+00 |
| S6 | −1.3583E−01 | −9.1099E−01 | 4.0056E+00 | −9.5078E+00 | 1.2635E+01 | −8.2627E+00 | 2.0973E+00 |
| S7 | −4.6117E−01 | 4.6443E−01 | −3.8262E−01 | 2.2156E−01 | −8.1472E−02 | 1.6596E−02 | −1.3960E−03 |
| S8 | −1.0127E−01 | 2.2482E−02 | 1.1127E−02 | −1.7628E−02 | 8.9352E−03 | −2.2018E−03 | 2.1299E−04 |

Table 3 gives the effective focal lengths f1 to f4 of the lenses in Embodiment 1, the total effective focal length f of the optical imaging lens assembly, and the half of the diagonal length ImgH of the effective pixel area of the photosensitive element on the image plane.

CT4/ET4=1.55, here, CT4 is the center thickness of the fourth lens E4 on the optical axis, and ET4 is the edge thickness of the fourth lens E4.

DT11/DT21=1.12, here, DT11 is the maximum effective half aperture of the object-side surface S1 of the first lens E1,

TABLE 3

| parameter | f1 (mm) | f2 (mm) | f3 (mm) | f4 (mm) | f (mm) | ImgH (mm) |
|---|---|---|---|---|---|---|
| value | 3.72 | −12062.21 | 4.35 | −13.65 | 2.70 | 2.27 | and DT21 is the maximum effective half aperture of the object-side surface S3 of the second lens E2.

DT11/DT22=0.94, here, DT11 is the maximum effective half aperture of the object-side surface S1 of the first lens E1, and DT22 is the maximum effective half aperture of the image-side surface S4 of the second lens E2.

CT2/CT3=0.56, here, CT2 is the center thickness of the second lens E2 on the optical axis, and CT3 is the center thickness of the third lens E3 on the optical axis.

T12/TTL=0.13, here, T12 is the spacing distance of the first lens E1 to the second lens E2 on the optical axis, and TTL is the spacing distance of the object-side surface S1 of the first lens E1 to the image plane S11 on the optical axis.

DT11/CT1=1.87, here, DT11 is the maximum effective half aperture of the object-side surface S1 of the first lens E1, and CT1 is the center thickness of the first lens E1 on the optical axis.

T34/T23=0.16, here, T34 is the spacing distance of the third lens E3 to the fourth lens E4 on the optical axis, and T23 is the spacing distance of the second lens E2 to the third lens E3 on the optical axis.

ΣCT/TTL=0.38, here, ΣCT is the sum of the center thicknesses of the first lens E1, the second lens E2, the third lens E3, and the fourth lens E4 on the optical axis, and TTL is the spacing distance of the object-side surface S1 of the first lens E1 to the image plane S11 on the optical axis.

R1/f=0.54, here, R1 is the radius of curvature of the object-side surface S1 of the first lens E1, and f is the total effective focal length of the optical imaging lens assembly.

R1/f1=0.39, here, R1 is the radius of curvature of the object-side surface S1 of the first lens E1, and f1 is the effective focal length of the first lens E1.

FIG. 2A shows the distortion curve of the optical imaging lens assembly according to Embodiment 1, representing amounts of distortion at different viewing angles. FIG. 2B shows the relative illumination curve of the optical imaging lens assembly according to Embodiment 1, representing relative illuminations corresponding to different viewing angles. As can be seen according to FIGS. 2A to 2B, the optical imaging lens assembly given in Embodiment 1 can achieve good imaging quality.

Embodiment 2

An optical imaging lens assembly according to Embodiment 2 of the present disclosure is described below with reference to FIGS. 3-4B. In the present embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly according to the exemplary implementations of the present disclosure may sequentially include: a first lens E1, a diaphragm STO, a second lens E2, a third lens E3, a fourth lens E4, an optical filter E5 and an image plane S11, from the object side to the image side along the optical axis. The optical imaging lens assembly may further include a photosensitive element disposed on the image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface.

The optical filter E5 may be an infrared bandpass optical filter having an object-side surface S9 and an image-side surface S10. The bandpass wavelength λ of the optical filter E5 may fluctuate based on the wavelength of used light source, and when the transmittance of the bandpass wavelength λ is greater than 50%, the long-wave cutoff wavelength of the bandpass wavelength λ is longer than the longest wavelength of the used light source by 0 nm to 30 nm, and the short-wave cutoff wavelength of the bandpass wavelength λ is shorter than the shortest wavelength of the used the light source by 0 nm to 30 nm.

Light from an object passes through the surfaces S1 to S10 sequentially and is finally imaged on the image plane S11.

Table 4 shows the surface type, the radius of curvature, the thickness, the material and the conic coefficient of each lens of the optical imaging lens assembly in Embodiment 2. The radius of curvature and the thickness are shown in millimeters (mm).

TABLE 4

| surface number | surface type | radius of curvature | thickness | material refractive index | abbe number | conic coefficient |
|---|---|---|---|---|---|---|
| OBJ | spherical | infinite | 500.0000 | | | |
| S1 | aspheric | 1.4700 | 0.4422 | 1.53 | 55.8 | −0.2824 |
| S2 | aspheric | 5.1876 | 0.0758 | | | 39.7829 |
| STO | spherical | infinite | 0.4468 | | | |
| S3 | aspheric | −8.1499 | 0.2350 | 1.53 | 55.8 | 91.5601 |
| S4 | aspheric | −7.1057 | 0.2155 | | | −83.1198 |
| S5 | aspheric | −0.8017 | 0.4194 | 1.62 | 23.5 | −0.8460 |
| S6 | aspheric | −0.7540 | 0.0350 | | | −2.7534 |
| S7 | aspheric | 1.1245 | 0.3928 | 1.62 | 23.5 | −1.3874 |
| S8 | aspheric | 0.8779 | 0.6110 | | | −5.9267 |
| S9 | spherical | infinite | 0.6100 | 1.52 | 64.2 | |
| S10 | spherical | infinite | 0.4476 | | | |
| S11 | spherical | infinite | | | | |

As can be obtained from Table 4, in Embodiment 2, the object-side surface and the image-side surface of any one of the first lens E1 to the fourth lens E4 are aspheric surfaces. Table 5 shows the high-order coefficients of the aspheric surfaces applicable in Embodiment 2. Here, the surface types of the aspheric surfaces may be defined by the formula (1) given in the above Embodiment 1.

TABLE 5

| surface number | A4 | A6 | A8 | A10 | A12 | A14 | A16 |
|---|---|---|---|---|---|---|---|
| S1 | 7.4569E−03 | −9.5613E−02 | 1.2423E+00 | −5.8623E+00 | 1.2847E+01 | −1.3603E+01 | 5.4441E+00 |
| S2 | −5.5338E−02 | 2.4126E−02 | −1.6594E+00 | 9.0961E+00 | −2.5489E+01 | 3.4167E+01 | −1.8281E+01 |
| S3 | −1.4774E−01 | −7.2162E−01 | 1.6565E+00 | −5.4087E+00 | 1.4357E+01 | −2.6295E+01 | 2.0055E+01 |
| S4 | −2.7785E−02 | −2.1709E−01 | −2.0157E+00 | 8.9262E+00 | −1.7485E+01 | 1.6568E+01 | −5.8516E+00 |
| S5 | 7.2333E−01 | −2.0252E+00 | 3.3328E+00 | −3.9654E+00 | 5.6100E+00 | −5.1002E+00 | 1.7628E+00 |
| S6 | −1.3423E−01 | −9.0526E−01 | 4.0062E+00 | −9.5217E+00 | 1.2650E+01 | −8.2701E+00 | 2.0948E+00 |
| S7 | −4.6097E−01 | 4.6392E−01 | −3.8274E−01 | 2.2160E−01 | −8.1453E−02 | 1.6599E−02 | −1.3968E−03 |
| S8 | −1.0023E−01 | 2.1762E−02 | 1.1125E−02 | −1.7621E−02 | 8.9432E−03 | −2.2004E−03 | 2.1301E−04 |

Table 6 gives the effective focal lengths f1 to f4 of the lenses in Embodiment 2, the total effective focal length f of the optical imaging lens assembly, and the half of the diagonal length ImgH of the effective pixel area of the photosensitive element on the image plane.

TABLE 6

| parameter | f1 (mm) | f2 (mm) | f3 (mm) | f4 (mm) | f (mm) | ImgH (mm) |
|---|---|---|---|---|---|---|
| value | 3.74 | 97.78 | 4.71 | −16.54 | 2.68 | 2.27 |

Figures 4A, 4B:
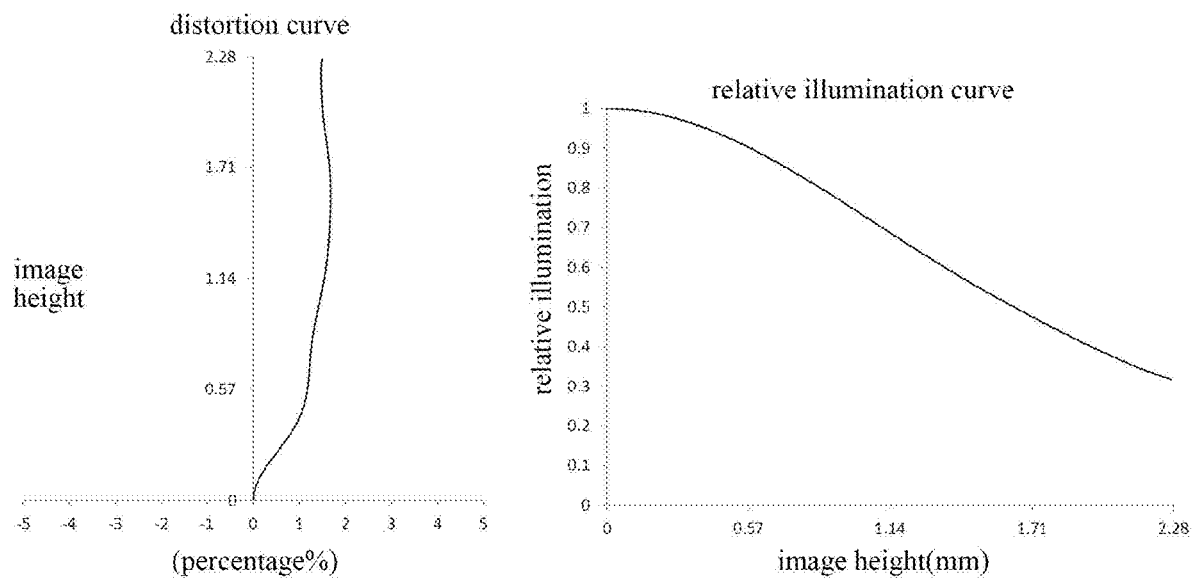
FIGS. 4A-4B respectively illustrate a distortion curve and a relative illumination curve of the optical imaging lens assembly according to Embodiment 2.

FIG. 4A shows the distortion curve of the optical imaging lens assembly according to Embodiment 2, representing amounts of distortion at different viewing angles. FIG. 4B shows the relative illumination curve of the optical imaging lens assembly according to Embodiment 2, representing relative illuminations corresponding to different viewing angles. As can be seen according to FIGS. 4A to 4B, the optical imaging lens assembly given in Embodiment 2 can achieve good imaging quality.

Embodiment 3

An optical imaging lens assembly according to Embodiment 3 of the present disclosure is described below with reference to FIGS. 5-6B. FIG. 5 is a schematic structural diagram illustrating the optical imaging lens assembly according to Embodiment 3 of the present disclosure.

As shown in FIG. 5, the optical imaging lens assembly according to the exemplary implementations of the present disclosure may sequentially include: a first lens E1, a diaphragm STO, a second lens E2, a third lens E3, a fourth lens E4, an optical filter E5 and an image plane S11, from the object side to the image side along the optical axis. The optical imaging lens assembly may further include a photosensitive element disposed on the image plane S11.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a concave surface.

The optical filter E5 may be an infrared bandpass optical filter having an object-side surface S9 and an image-side surface S10. The bandpass wavelength λ of the optical filter E5 may fluctuate based on the wavelength of used light source, and when the transmittance of the bandpass wavelength λ is greater than 50%, the long-wave cutoff wavelength of the bandpass wavelength λ is longer than the longest wavelength of the used light source by 0 nm to 30 nm, and the short-wave cutoff wavelength of the bandpass wavelength λ is shorter than the shortest wavelength of the used light source by 0 nm to 30 nm.

Light from an object passes through the surfaces S1 to S10 sequentially and is finally imaged on the image plane S11.

Table 7 shows the surface type, the radius of curvature, the thickness, the material and the conic coefficient of each lens of the optical imaging lens assembly in Embodiment 3. The radius of curvature and the thickness are shown in millimeters (mm).

TABLE 7

| | | | | material | | |
|---|---|---|---|---|---|---|
| surface number | surface type | radius of curvature | thickness | refractive index | abbe number | conic coefficient |
| OBJ | spherical | infinite | 700.0000 | | | |
| S1 | aspheric | 1.6458 | 0.4128 | 1.53 | 55.8 | −0.7124 |
| S2 | aspheric | 7.3009 | 0.0314 | | | 54.0698 |
| STO | spherical | infinite | 0.5150 | | | |
| S3 | aspheric | −8.0511 | 0.2683 | 1.53 | 55.8 | 98.4162 |
| S4 | aspheric | −11.8326 | 0.3694 | | | 97.6404 |
| S5 | aspheric | −0.7883 | 0.4249 | 1.62 | 23.5 | −0.6907 |
| S6 | aspheric | −0.8132 | 0.0350 | | | −2.4655 |
| S7 | aspheric | 1.4629 | 0.8000 | 1.62 | 23.5 | −0.6677 |
| S8 | aspheric | 1.1992 | 0.4439 | | | −6.9793 |

TABLE 7-continued

| surface number | surface type | radius of curvature | thickness | material refractive index | abbe number | conic coefficient |
|---|---|---|---|---|---|---|
| S9 | spherical | infinite | 0.2100 | 1.52 | 64.2 | |
| S10 | spherical | infinite | 0.6621 | | | |
| S11 | spherical | infinite | | | | |

As can be obtained from Table 7, in Embodiment 3, the object-side surface and the image-side surface of any one of the first lens E1 to be fourth lens E4 are aspheric surfaces. Table 8 shows the high-order coefficients of the aspheric surfaces applicable in Embodiment 3. Here, the surface types of the aspheric surfaces may be defined by the formula (1) given in the above Embodiment 1.

TABLE 8

| surface number | A4 | A6 | A8 | A10 | A12 | A14 | A16 |
|---|---|---|---|---|---|---|---|
| S1 | −6.6540E−03 | −1.8292E−02 | 3.9677E−01 | −3.1421E+00 | 8.5995E+00 | −1.1053E+01 | 5.2538E+00 |
| S2 | −4.1259E−03 | −1.4651E+00 | 1.1714E+01 | −5.4758E+01 | 1.3997E+02 | −1.8591E+02 | 1.0002E+02 |
| S3 | −2.2706E−01 | −5.8956E−02 | −2.7092E+00 | 1.4086E+01 | −3.5542E+01 | 4.3923E+01 | −1.9934E+01 |
| S4 | −7.9000E−02 | −1.5715E−01 | −1.5687E+00 | 7.0711E+00 | −1.4368E+01 | 1.4449E+01 | −5.5058E+00 |
| S5 | 6.8075E−01 | −1.5533E+00 | 2.2973E+00 | −2.2530E+00 | 1.4744E+00 | −1.2067E−01 | −2.8310E−01 |
| S6 | −1.6318E−01 | −1.5158E−01 | 6.9222E−01 | −1.6343E+00 | 2.1927E+00 | −1.3610E+00 | 3.0994E−01 |
| S7 | −2.5669E−01 | 1.7332E−01 | −8.5329E−02 | 2.7910E−02 | −5.9548E−03 | 7.4489E−04 | −4.1371E−05 |
| S8 | −5.4670E−02 | 2.5672E−02 | −7.7073E−03 | 1.9548E−03 | −5.0207E−04 | 8.0995E−05 | −5.3194E−06 |

Table 9 gives the effective focal lengths f1 to f4 of the lenses in Embodiment 3, the total effective focal length f of the optical imaging lens assembly, and the half of the diagonal length ImgH of the effective pixel area of the photosensitive element on the image plane.

TABLE 9

| parameter | f1 (mm) | f2 (mm) | f3 (mm) | f4 (mm) | f (mm) | ImgH (mm) |
|---|---|---|---|---|---|---|
| value | 3.94 | −49.06 | 7.57 | 68.33 | 2.81 | 2.27 |

FIG. 6A shows the distortion curve of the optical imaging lens assembly according to Embodiment 3, representing amounts of distortion at different viewing angles. FIG. 6B shows the relative illumination curve of the optical imaging lens assembly according to Embodiment 3, representing relative illuminations corresponding to different viewing angles. As can be seen according to FIGS. 6A to 6B, the optical imaging lens assembly given in Embodiment 3 can achieve good imaging quality.

Embodiment 4

An optical imaging lens assembly according to Embodiment 4 of the present disclosure is described below with reference to FIGS. 7-8B. FIG. 7 is a schematic structural diagram illustrating the optical imaging lens assembly according to Embodiment 4 of the present disclosure.

As shown in FIG. 7, the optical imaging lens assembly according to the exemplary implementations of the present disclosure may sequentially include: a first lens E1, a diaphragm STO, a second lens E2, a third lens E3, a fourth lens E4, an optical filter E5 and an image plane S11, from the object side to the image side along the optical axis. The optical imaging lens assembly may further include a photosensitive element disposed on the image plane S11.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface.

The optical filter E5 may be an infrared bandpass optical filter having an object-side surface S9 and an image-side surface S10. The bandpass wavelength λ of the optical filter E5 may fluctuate based on the wavelength of used light source, and when the transmittance of the bandpass wavelength λ is greater than 50%, the long-wave cutoff wavelength of the bandpass wavelength λ is longer than the longest wavelength of the used light source by 0 nm to 30 nm, and the short-wave cutoff wavelength of the bandpass wavelength λ is shorter than the shortest wavelength of the used light source by 0 nm to 30 nm.

Light from an object passes through the surfaces S1 to S10 sequentially and is finally imaged on the image plane S11.

Table 10 shows the surface type, the radius of curvature, the thickness, the material and the conic coefficient of each lens of the optical imaging lens assembly in Embodiment 4. The radius of curvature and the thickness are shown in millimeters (mm).

TABLE 10

| surface number | surface type | radius of curvature | thickness | material refractive index | abbe number | conic coefficient |
|---|---|---|---|---|---|---|
| OBJ | spherical | infinite | 700.0000 | | | |
| S1 | aspheric | 1.5365 | 0.4144 | 1.53 | 55.8 | −0.7179 |
| S2 | aspheric | 6.0104 | 0.0372 | | | 39.8476 |
| STO | spherical | infinite | 0.4867 | | | |
| S3 | aspheric | −10.4000 | 0.2350 | 1.53 | 55.8 | 76.2814 |
| S4 | aspheric | −16.5645 | 0.3721 | | | 99.0000 |
| S5 | aspheric | −0.7320 | 0.4002 | 1.62 | 23.5 | −0.6841 |
| S6 | aspheric | −0.6956 | 0.0350 | | | −2.5998 |
| S7 | aspheric | 1.3837 | 0.5707 | 1.62 | 23.5 | −0.7437 |
| S8 | aspheric | 0.9933 | 0.4959 | | | −7.3145 |
| S9 | spherical | infinite | 0.2100 | 1.52 | 64.2 | |
| S10 | spherical | infinite | 0.7108 | | | |
| S11 | spherical | infinite | | | | |

As can be obtained from Table 10, in Embodiment 4, the object-side surface and the image-side surface of any one of the first lens E1 to the fourth lens E4 are aspheric surfaces. Table 11 shows the high-order coefficients of the aspheric surfaces applicable in Embodiment 4. Here, the surface types of the aspheric surfaces may be defined by the formula (1) given in the above Embodiment 1.

TABLE 11

| surface number | A4 | A6 | A8 | A10 | A12 | A14 | A16 |
|---|---|---|---|---|---|---|---|
| S1 | 9.4183E−04 | −3.5073E−02 | 5.2869E−01 | −3.8901E+00 | 1.0735E+01 | −1.4059E+01 | 6.8164E+00 |
| S2 | −2.7337E−02 | −1.2398E+00 | 9.9925E+00 | −4.8582E+01 | 1.2862E+02 | −1.7718E+02 | 9.8971E+01 |
| S3 | −3.0312E−01 | 3.9173E−01 | −7.4034E+00 | 3.7322E+01 | −9.8884E+01 | 1.3136E+02 | −6.7044E+01 |
| S4 | −1.7138E−01 | 3.4065E−01 | −4.6902E+00 | 1.7696E+01 | −3.5223E+01 | 3.5846E+01 | −1.4146E+01 |
| S5 | 6.2725E−01 | −1.0040E+00 | −8.9468E−02 | 3.0021E+00 | −5.1823E+00 | 5.0135E+00 | −2.2328E+00 |
| S6 | −2.2743E−01 | −1.3536E−01 | 1.3259E+00 | −4.2857E+00 | 6.6259E+00 | −4.6342E+00 | 1.1988E+00 |
| S7 | −2.4370E−01 | 1.2828E−01 | −4.8259E−02 | 1.2012E−02 | −1.9278E−03 | 1.6214E−04 | −4.4763E−06 |
| S8 | −4.3387E−02 | 6.3912E−03 | 9.4708E−04 | 1.9733E−04 | −3.3284E−04 | 6.7515E−05 | −4.3916E−06 |

Table 12 gives the effective focal lengths f1 to f4 of the lenses in Embodiment 4, the total effective focal length f of the optical imaging lens assembly, and the half of the diagonal length ImgH of the effective pixel area of the photosensitive element on the image plane.

TABLE 12

| parameter | f1 (mm) | f2 (mm) | f3 (mm) | f4 (mm) | f (mm) | ImgH (mm) |
|---|---|---|---|---|---|---|
| value | 3.80 | −53.80 | 4.36 | −12.90 | 2.77 | 2.27 |

FIG. 8A shows the distortion curve of the optical imaging lens assembly according to Embodiment 4, representing amounts of distortion at different viewing angles. FIG. 8B shows the relative illumination curve of the optical imaging lens assembly according to Embodiment 4, representing relative illuminations corresponding to different viewing angles. As can be seen according to FIGS. 8A to 8B, the optical imaging lens assembly given in Embodiment 4 can achieve good imaging quality.

Embodiment 5

An optical imaging lens assembly according to Embodiment 5 of the present disclosure is described below with reference to FIGS. 9-10B. FIG. 9 is a schematic structural diagram illustrating the optical imaging lens assembly according to Embodiment 5 of the present disclosure.

As shown in FIG. 9, the optical imaging lens assembly according to the exemplary implementations of the present disclosure may sequentially include: a first lens E1, a diaphragm STO, a second lens E2, a third lens E3, a fourth lens E4, an optical filter E5 and an image plane S11, from the object side to the image side along the optical axis. The optical imaging lens assembly may further include a photosensitive element disposed on the image plane S11.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface.

The optical filter E5 may be an infrared bandpass optical filter having an object-side surface S9 and an image-side surface S10. The bandpass wavelength λ of the optical filter E5 may fluctuate based on the wavelength of used light source, and when the transmittance of the bandpass wavelength λ is greater than 50%, the long-wave cutoff wavelength of the bandpass wavelength λ is longer than the longest wavelength of the used light source by 0 nm to 30 nm, and the short-wave cutoff wavelength of the bandpass wavelength λ is shorter than the shortest wavelength of the used light source by 0 nm to 30 nm.

Light from an object passes through the surfaces S1 to S10 sequentially and is finally imaged on the image plane S11.

Table 13 shows the surface type, the radius of curvature, the thickness, the material and the conic coefficient of each lens of the optical imaging lens assembly in Embodiment 5. The radius of curvature and the thickness are shown in millimeters (mm).

TABLE 13

| surface number | surface type | radius of curvature | thickness | material refractive index | abbe number | conic coefficient |
|---|---|---|---|---|---|---|
| OBJ | spherical | infinite | 700.0000 | | | |
| S1 | aspheric | 1.4382 | 0.4401 | 1.53 | 55.8 | −0.3025 |
| S2 | aspheric | 5.3057 | 0.0491 | | | 38.3358 |
| STO | spherical | infinite | 0.5069 | | | |
| S3 | aspheric | −4.6833 | 0.2350 | 1.53 | 55.8 | 30.0204 |
| S4 | aspheric | −21.3314 | 0.2026 | | | 99.0000 |
| S5 | aspheric | −0.9023 | 0.4426 | 1.62 | 23.5 | −0.6870 |
| S6 | aspheric | −0.7002 | 0.0350 | | | −4.6948 |
| S7 | aspheric | 1.8453 | 0.5176 | 1.62 | 23.5 | −0.7539 |
| S8 | aspheric | 1.1145 | 0.5568 | | | −9.9964 |
| S9 | spherical | infinite | 0.2100 | 1.52 | 64.2 | |
| S10 | spherical | infinite | 0.7750 | | | |
| S11 | spherical | infinite | | | | |

As can be obtained from Table 13, in Embodiment 5, the object-side surface and the image-side surface of any one of the first lens E1 to the fourth lens E4 are aspheric surfaces. Table 14 shows the high-order coefficients of the aspheric surfaces applicable in Embodiment 5. Here, the surface types of the aspheric surfaces may be defined by the formula (1) given in the above Embodiment 1.

TABLE 14

| surface number | A4 | A6 | A8 | A10 | A12 | A14 | A16 |
|---|---|---|---|---|---|---|---|
| S1 | 1.5643E−02 | −6.6412E−02 | 3.4933E−01 | −1.8155E+00 | 4.6126E+00 | −6.1251E+00 | 2.9083E+00 |
| S2 | −2.2144E−02 | −1.0903E+00 | 8.5800E+00 | −4.0149E+01 | 1.0045E+02 | −1.3113E+02 | 6.9759E+01 |
| S3 | −2.8882E−01 | −2.0277E+00 | 1.4982E+01 | −7.1774E+01 | 1.9034E+02 | −2.6342E+02 | 1.4905E+02 |
| S4 | −1.8329E−01 | −3.4262E−01 | 3.1534E+00 | −1.2086E+01 | 2.3569E+01 | −2.5933E+01 | 1.2223E+01 |
| S5 | 3.8320E−01 | 1.1536E−01 | −2.0929E+00 | 9.2979E+00 | −2.0230E+01 | 1.9235E+01 | −6.4185E+00 |
| S6 | −8.6310E−01 | 2.2750E+00 | −4.4435E+00 | 5.6282E+00 | −4.3352E+00 | 1.9913E+00 | −4.2489E−01 |
| S7 | −2.0947E−01 | 1.4998E−01 | −1.4562E−01 | 1.0252E−01 | −4.1373E−02 | 8.5910E−03 | −7.1240E−04 |
| S8 | −8.9843E−02 | 5.2557E−02 | −4.0914E−02 | 1.9341E−02 | −4.8819E−03 | 5.4653E−04 | −1.7023E−05 |

Table 15 gives the effective focal lengths f1 to f4 of the lenses in Embodiment 5, the total effective focal length f of the optical imaging lens assembly, and the half of the diagonal length ImgH of the effective pixel area of the photosensitive element on the image plane.

TABLE 15

| parameter | f1 (mm) | f2 (mm) | f3 (mm) | f4 (mm) | f (mm) | ImgH (mm) |
|---|---|---|---|---|---|---|
| value | 3.61 | −11.46 | 2.76 | −6.25 | 2.79 | 2.40 |

FIG. 10A shows the distortion curve of the optical imaging lens assembly according to Embodiment 5, representing amounts of distortion at different viewing angles. FIG. 10B shows the relative illumination curve of the optical imaging lens assembly according to Embodiment 5, representing relative illuminations corresponding to different viewing angles. As can be seen according to FIGS. 10A to 10B, the optical imaging lens assembly given in Embodiment 5 can achieve good imaging quality.

Embodiment 6

An optical imaging lens assembly according to Embodiment 6 of the present disclosure is described below with reference to FIGS. 11-12B. FIG. 11 is a schematic structural diagram illustrating the optical imaging lens assembly according to Embodiment 6 of the present disclosure.

As shown in FIG. 11, the optical imaging lens assembly according to the exemplary implementations of the present disclosure may sequentially include: a diaphragm STO, a first lens E1, a second lens E2, a third lens E3, a fourth lens E4, an optical filter E5 and an image plane S11, from the object side to the image side along the optical axis. The optical imaging lens assembly may further include a photosensitive element disposed on the image plane S11.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a concave surface.

The optical filter E5 may be an infrared bandpass optical filter having an object-side surface S9 and an image-side surface S10. The bandpass wavelength $\lambda$ of the optical filter E5 may fluctuate based on the wavelength of used light source, and when the transmittance of the bandpass wavelength $\lambda$ is greater than 50%, the long-wave cutoff wavelength of the bandpass wavelength λ is longer than the longest wavelength of the used light source by 0 nm to 30 nm, and the short-wave cutoff wavelength of the bandpass wavelength λ is shorter than the shortest wavelength of the used light source by 0 nm to 30 nm.

Light from an object passes through the surfaces S1 to S10 sequentially and is finally imaged on the image plane S11.

Table 16 shows the surface type, the radius of curvature, the thickness, the material and the conic coefficient of each lens of the optical imaging lens assembly in Embodiment 6. The radius of curvature and the thickness are shown in millimeters (mm).

FIG. 12A shows the distortion curve of the optical imaging lens assembly according to Embodiment 6, representing amounts of distortion at different viewing angles. FIG. 12B shows the relative illumination curve of the optical imaging lens assembly according to Embodiment 6, representing relative illuminations corresponding to different viewing angles. As can be seen according to FIGS. 12A to 12B, the optical imaging lens assembly given in Embodiment 6 can achieve good imaging quality.

To sum up, Embodiments 1-6 respectively satisfy the relationship shown in Table 19.

TABLE 16

| surface number | surface type | radius of curvature | thickness | material refractive index | abbe number | conic coefficient |
|---|---|---|---|---|---|---|
| OBJ | spherical | infinite | 700.0000 | | | |
| STO | spherical | infinite | −0.1429 | | | |
| S1 | aspheric | 1.6482 | 0.4037 | 1.53 | 55.8 | −0.8248 |
| S2 | aspheric | 7.1473 | 0.5321 | | | 48.5991 |
| S3 | aspheric | −7.9741 | 0.2673 | 1.53 | 55.8 | 96.3856 |
| S4 | aspheric | −11.9461 | 0.3959 | | | 59.6649 |
| S5 | aspheric | −0.8009 | 0.4202 | 1.62 | 23.5 | −0.6995 |
| S6 | aspheric | −0.8451 | 0.0350 | | | −2.4869 |
| S7 | aspheric | 1.4025 | 0.8000 | 1.62 | 23.5 | −0.6897 |
| S8 | aspheric | 1.2332 | 0.4459 | | | −7.0825 |
| S9 | spherical | infinite | 0.2100 | 1.52 | 64.2 | |
| S10 | spherical | infinite | 0.6640 | | | |
| S11 | spherical | infinite | | | | |

As can be obtained from Table 16, in Embodiment 6, the object-side surface and the image-side surface of any one of the first lens E1 to the fourth lens E4 are aspheric surfaces. Table 17 shows the high-order coefficients of the aspheric surfaces applicable in Embodiment 6. Here, the surface types of the aspheric surfaces may be defined by the formula (1) given in the above embodiment 1.

TABLE 17

| surface number | A4 | A6 | A8 | A10 | A12 | A14 | A16 |
|---|---|---|---|---|---|---|---|
| S1 | −2.4371E−03 | −3.1302E−02 | 4.6580E−01 | −3.6093E+00 | 1.0166E+01 | −1.3522E+01 | 6.6493E+00 |
| S2 | 9.6619E−03 | −1.7812E+00 | 1.4552E+01 | −6.8614E+01 | 1.7681E+02 | −2.3653E+02 | 1.2810E+02 |
| S3 | −2.2091E−01 | −1.5921E−01 | −2.1990E+00 | 1.2900E+01 | −3.4628E+01 | 4.4338E+01 | −2.0629E+01 |
| S4 | −6.6381E−02 | −4.0008E−01 | −2.3453E−01 | 3.2551E+00 | −8.0750E+00 | 9.0148E+00 | −3.6455E+00 |
| S5 | 7.0116E−01 | −1.7113E+00 | 2.7923E+00 | −3.3593E+00 | 3.3215E+00 | −1.8483E+00 | 3.5374E−01 |
| S6 | −1.3311E−01 | −2.1826E−01 | 7.0138E−01 | −1.4699E+00 | 1.9116E+00 | −1.1640E+00 | 2.5946E−01 |
| S7 | −2.5052E−01 | 1.5252E−01 | −6.7842E−02 | 2.0155E−02 | −4.0278E−03 | 4.9041E−04 | −2.7403E−05 |
| S8 | −2.2718E−02 | −1.1304E−02 | 1.4416E−02 | −5.6724E−03 | 1.0070E−03 | −7.8007E−05 | 1.6200E−06 |

Table 18 gives the effective focal lengths f1 to f4 of the lenses in Embodiment 6, the total effective focal length f of the optical imaging lens assembly, and the half of the diagonal length ImgH of the effective pixel area of the photosensitive element on the image plane.

TABLE 18

| parameter | f1 (mm) | f2 (mm) | f3 (mm) | f4 (mm) | f (mm) | ImgH (mm) |
|---|---|---|---|---|---|---|
| value | 3.97 | −46.65 | 9.44 | 20.59 | 2.80 | 2.40 |

TABLE 19

| conditional expression | embodiment | | | | | |
|---|---|---|---|---|---|---|
| | 1 | 2 | 3 | 4 | 3 | 6 |
| f1/f | 1.38 | 1.39 | 1.40 | 1.37 | 1.29 | 1.42 |
| f/EPD | 1.70 | 1.65 | 1.99 | 1.99 | 1.99 | 1.99 |

TABLE 19-continued

| conditional expression | embodiment | | | | | |
|---|---|---|---|---|---|---|
| | 1 | 2 | 3 | 4 | 3 | 6 |
| DT42/ImgH | 0.78 | 0.78 | 0.94 | 0.90 | 0.80 | 0.94 |
| R5/R6 | 1.08 | 1.06 | 0.97 | 1.05 | 1.29 | 0.95 |
| SAG31/CT3 | −0.82 | −0.81 | −1.12 | −1.23 | −0.80 | −1.01 |
| CT4/ET4 | 1.55 | 1.55 | 1.29 | 1.56 | 2.36 | 1.50 |
| DT11/DT21 | 1.12 | 1.12 | 1.07 | 1.07 | 1.14 | 1.04 |
| DT11/DT22 | 0.94 | 0.94 | 0.89 | 0.93 | 0.94 | 0.83 |
| CT2/CT3 | 0.56 | 0.56 | 0.63 | 0.59 | 0.53 | 0.64 |
| T12/TTL | 0.13 | 0.13 | 0.13 | 0.13 | 0.14 | 0.13 |
| DT11/CT1 | 1.87 | 1.87 | 2.02 | 1.99 | 1.90 | 1.74 |

TABLE 19-continued

| conditional expression | embodiment | | | | | |
|---|---|---|---|---|---|---|
| | 1 | 2 | 3 | 4 | 3 | 6 |
| T34/T23 | 0.16 | 0.16 | 0.09 | 0.09 | 0.17 | 0.09 |
| ΣCT/TTL | 0.38 | 0.38 | 0.46 | 0.41 | 0.41 | 0.45 |
| R1/f | 0.54 | 0.55 | 0.59 | 0.55 | 0.52 | 0.59 |
| R1/f1 | 0.39 | 0.39 | 0.42 | 0.40 | 0.40 | 0.42 |

The present disclosure further provides an imaging device, having a photosensitive element that may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging lens assembly comprising sequentially, from an object side to an image side along an optical axis: a first lens, a second lens, a third lens, and a fourth lens, wherein,
the first lens has a positive refractive power, and an object-side surface of the first lens is a convex surface;
the second lens has a positive refractive power or a negative refractive power, an object-side surface of the second lens is a concave surface, and an image-side surface of the second lens is a convex surface;
the third lens has a positive refractive power, an object-side surface of the third lens is a concave surface, and an image-side surface of the third lens is a convex surface;
the fourth lens has a positive refractive power or a negative refractive power; and
an effective focal length f1 of the first lens and a total effective focal length f of the optical imaging lens assembly satisfy: $1.2<f1/f<1.8$,
wherein a maximum effective half aperture DT11 of the object-side surface of the first lens and a center thickness CT1 of the first lens on the optical axis satisfy: $1.7<DT11/CT1<2.2$.

2. The optical imaging lens assembly according to claim 1, wherein the optical imaging lens assembly further comprises an infrared bandpass optical filter disposed between the fourth lens and an image plane of the optical imaging lens assembly.

3. The optical imaging lens assembly according to claim 1, wherein a radius of curvature R1 of the object-side surface of the first lens and the total effective focal length f of the optical imaging lens assembly satisfy: $0.3<R1/f<0.7$.

4. The optical imaging lens assembly according to claim 1, wherein a radius of curvature R1 of the object-side surface of the first lens and the effective focal length f1 of the first lens satisfy: $0.3<R1/f1<0.6$.

5. The optical imaging lens assembly according to claim 1, wherein a sum of center thicknesses ΣCT of the first lens, the second lens, the third lens, and the fourth lens on the optical axis and a spacing distance TTL of the object-side surface of the first lens to an image plane of the optical imaging lens assembly on the optical axis satisfy: $0.2<\Sigma CT/TTL<0.5$.

6. The optical imaging lens assembly according to claim 5, wherein a spacing distance T12 of the first lens to the second lens on the optical axis and the spacing distance TTL of the object-side surface of the first lens to the image plane of the optical imaging lens assembly on the optical axis satisfy: $0.1<T12/TTL<0.2$.

7. The optical imaging lens assembly according to claim 5, wherein a spacing distance T34 of the third lens to the fourth lens on the optical axis and a spacing distance T23 of the second lens to the third lens on the optical axis satisfy: $T34/T23<0.2$.

8. The optical imaging lens assembly according to claim 5, wherein a center thickness CT2 of the second lens on the optical axis and a center thickness CT3 of the third lens on the optical axis satisfy: $0.4<CT2/CT3<0.7$.

9. The optical imaging lens assembly according to claim 5, wherein a center thickness CT4 of the fourth lens on the optical axis and an edge thickness ET4 of the fourth lens satisfy: $1.2<CT4/ET4<2.4$.

10. The optical imaging lens assembly according to claim 1, wherein the maximum effective half aperture DT11 of the object-side surface of the first lens and a maximum effective half aperture DT21 of the object-side surface of the second lens satisfy: $1.0<DT11/DT21<1.3$.

11. The optical imaging lens assembly according to claim 1, wherein the maximum effective half aperture DT11 of the object-side surface of the first lens and a maximum effective half aperture DT22 of the image-side surface of the second lens satisfy: $0.8<DT11/DT22<1.1$.

12. The optical imaging lens assembly according to claim 1, wherein a radius of curvature R5 of the object-side surface of the third lens and a radius of curvature R6 of the image-side surface of the third lens satisfy: $0.9<R5/R6<1.3$.

13. The optical imaging lens assembly according to claim 12, wherein a distance SAG31 from an intersection of the object-side surface of the third lens and the optical axis to a vertex of a maximum effective half aperture of the object-side surface of the third lens on the optical axis and a center thickness CT3 of the third lens on the optical axis satisfy: $-1.3<SAG31/CT3<-0.7$.

14. The optical imaging lens assembly according to claim 1, wherein a maximum effective half aperture DT42 of an image-side surface of the fourth lens and half of a diagonal length ImgH of an effective pixel area of a photosensitive element on an image plane of the optical imaging lens assembly satisfy: $0.7<DT42/ImgH<1$.

15. The optical imaging lens assembly according to claim 1, wherein the total effective focal length f of the optical imaging lens assembly and an entrance pupil diameter EPD of the optical imaging lens assembly satisfy: $f/EPD<2.1$.

16. An optical imaging lens assembly comprising sequentially, from an object side to an image side along an optical axis: a first lens, a second lens, a third lens, and a fourth lens, wherein,
the first lens has a positive refractive power, and an object-side surface of the first lens is a convex surface;

the second lens has a positive refractive power or a negative refractive power, an object-side surface of the second lens is a concave surface, and an image-side surface of the second lens is a convex surface;

the third lens has a positive refractive power, an object-side surface of the third lens is a concave surface, and an image-side surface of the third lens is a convex surface;

the fourth lens has a positive refractive power or a negative refractive power; and a center thickness CT2 of the second lens on the optical axis and a center thickness CT3 of the third lens on the optical axis satisfy: 0.4<CT2/CT3<0.7, wherein a distance SAG31 from an intersection of the object-side surface of the third lens and the optical axis to a vertex of a maximum effective half aperture of the object-side surface of the third lens on the optical axis and a center thickness CT3 of the third lens on the optical axis satisfy: −1.3<SAG31/CT3<−0.7.

17. The optical imaging lens assembly according to claim 16, wherein a radius of curvature R1 of the object-side surface of the first lens and a total effective focal length f of the optical imaging lens assembly satisfy: 0.3<R1/f<0.7.

18. The optical imaging lens assembly according to claim 17, wherein the radius of curvature R1 of the object-side surface of the first lens and an effective focal length f1 of the first lens satisfy: 0.3<R1/f1<0.6.

19. The optical imaging lens assembly according to claim 18, wherein the effective focal length f1 of the first lens and the total effective focal length f of the optical imaging lens assembly satisfy: 1.2<f1/f<1.8.

* * * * *